March 26, 1963  P. H. ACLOQUE  3,082,664
APPARATUS FOR THE OPTICAL DETERMINATION OF STRESSES
Filed Aug. 23, 1957  4 Sheets-Sheet 2

*INVENTOR.*
PAUL HENRI ACLOQUE
BY *Bauer and Seymour*
ATTORNEYS

March 26, 1963 P. H. ACLOQUE 3,082,664
APPARATUS FOR THE OPTICAL DETERMINATION OF STRESSES
Filed Aug. 23, 1957 4 Sheets-Sheet 3

INVENTOR.
PAUL HENRI ACLOQUE
BY Bauer and Seymour
ATTORNEYS

March 26, 1963 P. H. ACLOQUE 3,082,664
APPARATUS FOR THE OPTICAL DETERMINATION OF STRESSES
Filed Aug. 23, 1957 4 Sheets-Sheet 4

INVENTOR.
PAUL HENRI ACLOQUE
BY
Bauer and Seymour
ATTORNEYS

| United States Patent Office | 3,082,664
|---|---|
| | Patented Mar. 26, 1963 |

3,082,664
APPARATUS FOR THE OPTICAL DETERMINA-
TION OF STRESSES
Paul H. Acloque, Paris, France, assignor to Compagnie
de Saint-Gobain, Paris, France
Filed Aug. 23, 1957, Ser. No. 679,808
Claims priority, application France Sept. 6, 1956
31 Claims. (Cl. 88—14)

This invention relates to an optical apparatus adapted for measuring stresses in a sheet or plate of transparent material, such as glass, capable of becoming anisotropic under the influence of these stresses, the system of said stresses being two dimensional and parallel to the faces of the sheet or plate.

This application is a continuation in part of application Serial No. 549,527, filed November 28, 1955 and bearing the same title and now U.S. Patent No. 2,995,060.

It is among the objects of the present invention to provide an improved apparatus for measuring internal stresses in a material capable of transmitting and internally reflecting light rays, the material being capable of becoming anisotropic under the influence of such stresses.

Another object of the invention lies in the provision of an improved polarimetric apparatus of the type above indicated which is economical in its space requirements and which presents the emergent light rays in a path such that they may be more easily examined by eye.

A still further object lies in the provision of polarimetric apparatus of the type indicated of such construction that the source of collimated polarized light which is directed upon the specimen and the optical means for conducting the rays emerging from the specimen are contained in a single housing disposed normal to the broad surfaces of the specimen.

Another object of the apparatus, in one embodiment thereof, lies in the provision of polarimetric apparatus of the type described which with one setting of the apparatus on the specimen allows the rapid successive measurement of principal stresses in the specimen which are disposed at right angles to each other.

Still a further object of the invention, in another embodiment thereof, is the provision of polarimetric apparatus by which the value of a principal stress in the specimen may be obtained substantially directly from one observation or measurement of the specimen.

The above and further objects and novel features of the invention will more fully appear from the following description when the same is read in connection with the accompanying drawings, it is to be expressly understood, however, that the drawings are for the purpose of illustration only and are not intended as a definition of the limits of the invention.

In the drawings, wherein like reference characters refer to like parts throughout the several views.

Figure 1:
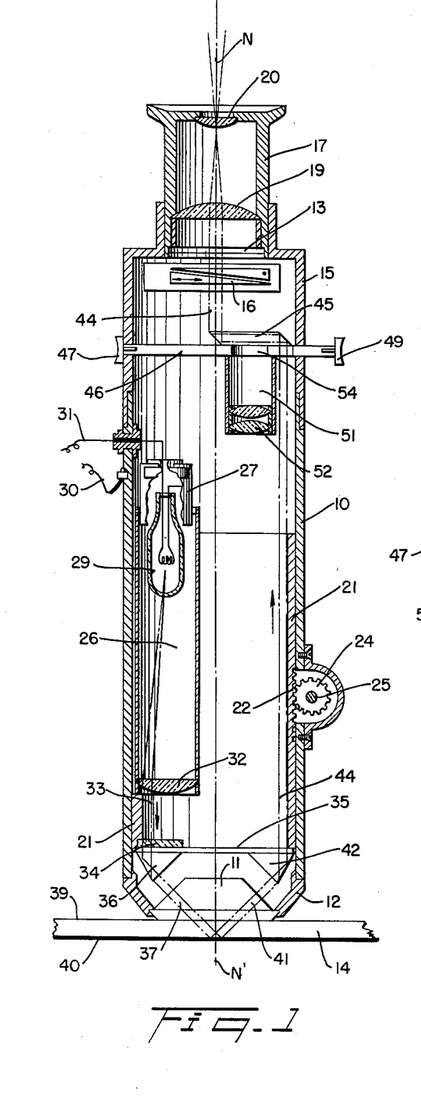
FIG. 1 is a view in vertical axial section through a polarimetric apparatus in accordance with a first embodiment of the invention, certain parts of the apparatus being shown in elevation, the apparatus being shown with its parts in position to receive and measure light reflected internally of the specimen.
Figure 1A:
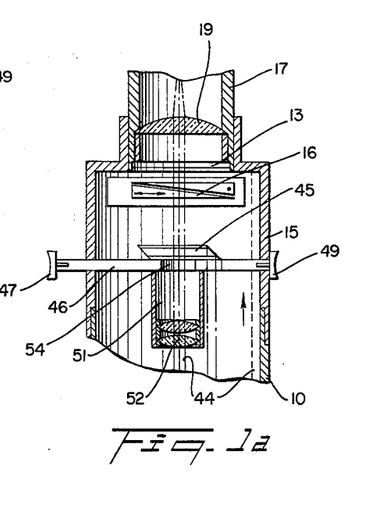
FIG. 1a is a fragmentary view in axial section of the apparatus shown in FIG. 1, the latter figure showing the apparatus with parts thereof positioned to permit the direct observation of the specimen.

The present invention represents an improvement over the apparatus shown in patent application Serial No. 549,527. The apparatus of the invention, in all its disclosed embodiments, is a unitary one having both the one or more light sources and the means for conducting and analyzing the emergent rays mounted within a single housing which is positioned normal to the upper surface of the specimen when in use. Three embodiments of the apparatus are disclosed herein: The first embodiment is shown in FIGS. 1 and 1a, wherein a single source of collimated polarized light is employed. The determination of the principal stresses in the specimen is made with this apparatus by taking a first reading at one angular position of the apparatus about its axis, and taking a second reading at a position wherein the apparatus is displaced 90° about its axis from the first position.

The second embodiment is shown in FIGS. 2 to 6, inclusive. In such apparatus two sources of collimated polarized light are mounted within the housing of the apparatus in positions displaced 90° with respect to each other about the axis of the housing. By suitable optical means the rays from both such sources are caused simultaneously to enter the specimen and, after their reflection from the lower surface of the specimen, are both brought to the eyepiece of the apparatus in such manner that they lie close to but distinct from each other so that they can be readily observed and measured in succession.

The third embodiment is shown in FIGS. 9 to 12, inclusive. Such apparatus, which has a single light source, is provided with a novel objective prism device of such construction that the single beam of polarized light rays employed is directed into and caused to be reflected internally from a specimen a plurality of times, following which the light beam is brought to the eyepiece for observation and measurement. The angles between the planes of successive parts of the total path of the beam, each such part including a path of incidence upon and emergence from the specimen, are such that the light beam reaching the eyepiece gives a direct reading of a principal stress in the specimen.

Proceeding now to a detailed description of the apparatus of the first embodiment, it will be seen that such apparatus has a main circular cylindrical outer barrel 10 which carries a large lower prism 11 in a bezel ring 12 mounted upon the lower end of the barrel. Prism 11, during use of the apparatus, is positioned with its flat lower face tightly in contact with the upper face 39 of a specimen 14, which may be for example a sheet or plate of tempered glass. The prism 11 has an index of refraction such as to minimize refraction between it and the specimen 14. On its upper end barrel 10 has a necked end portion 15 which carries an eyepiece barrel 17 adjustably mounted longitudinally thereof. Mounted within barrel 17 are an analyzer 13 and conventional objective and eyepiece lenses 19 and 20 through which the emergent rays pass along the axis N—N' of barrel 10. Mounted within portion 15 is a conventional optical wedge compensator 16, which may be of the Babinet type. Such compensator may have conventional means (not shown) by which the wedges be moved longitudinally of each other in measured amounts, whereby to allow the compensation of extra birefringences, or it may include a scale, on which such birefringences can be known from the displacement of one fringe or of a set of fringes. Compensator 16 and the eyepiece, including analyzer 13 and lenses 19 and 20, thus allow the direct measurement of birefringences differences between the optical paths of the components of the light due to the stresses in specimen 14.

Within the lower end of barrel 10 there is accurately slidably mounted an inner barrel 21 which may be adjusted longitudinally of barrel 10 by a rack and pinion arrangement including a rack 22 on inner barrel 21 and a pinion 24 mounted on a pinion shaft 25 which is journalled in a housing on outer barrel 10. Such adjustment of the inner barrel permits the apparatus to be employed with specimens of different thicknesses. Within inner barrel 21 and parallel to the axis of the apparatus there is mounted a smaller tube or barrel 26 carrying means for providing a source of collimated light rays. Barrel 26 has a diameter somewhat less than half the diameter of inner tube 21. A downwardly open socket 27 is mounted on the upper end of barrel 26, the socket carrying a light bulb 29 therein which is supplied with energizing current through a grounded lead wire 30 connected to the barrel 10 and a flexible lead wire 31 connected to the socket. Barrel 26 carries an objective lens 32 on its lower end, lens 32 being of such character that the light rays 33 issuing therefrom are collimated or parallel.

Positioned on the bottom of inner barrel 21 is a transparent transverse support 35 which carries a light polarizing plate 34 on its upper surface at the side thereof beneath barrel 26. Plate 34 is of the plane polarizing type. Support 35 carries on its undersurface two similar oppositely disposed prisms 36, 42 which are located on a diameter of barrel 21. As shown, prism 36 lies beneath barrel 26 and polarizer 34. Prism 36 and 42 have radially inwardly disposed slanting surfaces inclined at angles of 45° with respect to axis N—N'. Prism 11 has oppositely disposed surfaces parallel to the radially inward surfaces of prisms 36 and 42. Prisms 36, 11, and 42 are so arranged that, when the apparatus is disposed as in FIG. 1, the collimated rays 33 after passing through polarizer 34 are directed by prism 36 in a beam 37 having a predetermined angle of incidence with respect to the upper surface 39 of specimen 14. In the embodiment shown such angle of incidence is 45°, although it be made of some other value, if desired. Beam 37 is totally reflected by lower surface 40 of specimen 14, the reflected rays emerging in a beam 41 from the specimen. Prism 42 reflects the emergent rays into a vertical beam 44 which lies close to the inner wall of barrel 21.

Below compensator 16 part 15 of the apparatus has a horizontal diaphragm 46 having end portions extending through aligned openings in member 15 and bearing the thumb pieces 47, 49 by which the diaphragm may be reciprocated into either of the positions shown in FIGS. 1 and 1a. Supported on top of diaphragm 46 is a prism 45, the right hand end of which, when diaphragm 46 is in the position shown in FIG. 1, intercepts beam 44 rising along the side of barrel 10. Prism 45 reflects such beam a short distance horizontally through the prism, the beam then being reflected by the left hand end of prism 45 into a vertical beam lying along axis N—N' so that it passes vertically through compensator 16, analyzer 13, and the lenses of the eyepiece.

Vertically below the body of prism 45 and aligned with an opening 54 in diaphragm 46 is a short barrel 51 supported on the diaphragm. At its lower end barrel 51 carries objective lenses 52. When diaphragm 46 is reciprocated into the position shown in FIG. 1a, the axis of barrel 51 lies along the axis N—N' of the apparatus. This allows the direct observation of the surfaces of the specimen. This is useful as in the placing of the apparatus on the specimen preliminary to making measurements of the stresses therein. It will be observed that, in the embodiment shown, polarizer 34 does not extend to the radially inner edge of barrel 26. Consequently, the specimen is illuminated at least partially by unpolarized light, which increases the illumination of the specimen and facilitates its observation when the apparatus is in the position of FIG. 1a.

The apparatus of FIGS. 1 and 1a enables an operator to determine, at any point of a stressed sheet or plate of the character described, the distinct value of each one of the rectangular stresses $p$ and $q$ which are the principal stresses at such point. This can be done even if the stress is a stress of revolution about an axis perpendicular to the sheet or plate.

As was set out in application Serial No. 549,527, the observation of the emergent light, along a direction making an angle $\theta$ with the perpendicular of the faces of the specimen, enables an operator to observe and measure a birefringence which is related to the principal stresses in the specimen. In the general case where the values of the principal stresses are not identical, two separate readings, each in a plane of incidence coinciding, respectively, with each of the principal planes give the values $d_1$ and $d_2$ of the differences between the optical paths of the components of the light, that is, the birefringences, from which the values of $p$ and $q$ may be obtained. When $\theta$ equals 45°, which is true of the angles which incident and emergent rays 37 and 41 make with respect to the normal to the speciment the relationships between the measured values $d_1$ and $d_2$ of the birefringences and the principal stresses $p$, $q$ are given by the equations:

$$p = a(d_1 + hd_2)$$
$$q = a(d_2 + hd_1)$$

The factors $a$, $h$ are constants, $a$ depending on the apparatus, and on the nature and thickness of the specimen, and $h$ being equal to $\cos^2$ of the angle $\theta$ of incidence.

The apparatus of the second embodiment, shown in FIGS. 2 to 6, inclusive, makes possible the simultaneous observation of the two birefringences $d_1$ and $d_2$. In the use of the apparatus, it is placed upon the specimen so that the vertical plane containing incident light beam 37' and emergent light beam 41' coincides with the direction of one of the principal stresses.

The apparatus of the second embodiment is generally similar to that of the first embodiment above described as to its main frame parts, the first light source, and in the manner of conducting the rays from such first light source through the specimen and then receiving, analyzing, and observing them. Consequently, for simplicity, parts of the apparatus of FIGS. 2 to 6, inclusive, which are similar to those of FIGS. 1 and 1a are designated by the same reference characters with an added prime.

Figures 2, 3, 4, 5, 6:
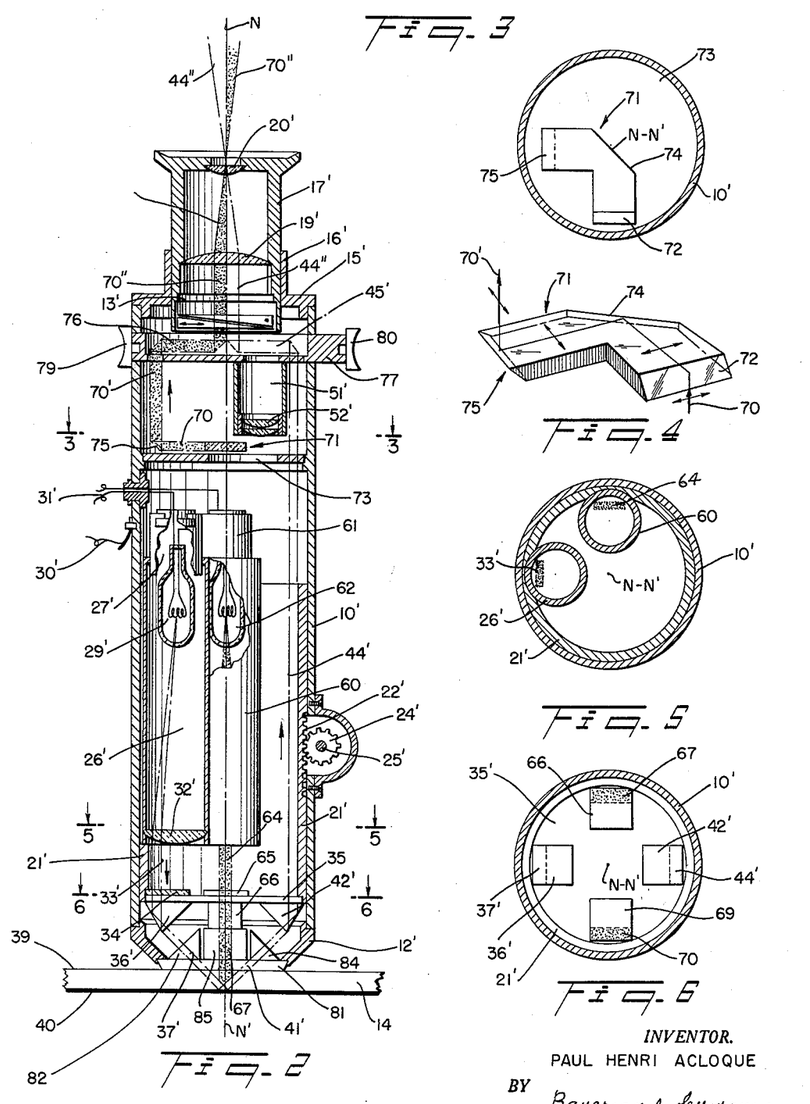
FIG. 2 is a view in vertical axial section through a second embodiment of polarimetric apparatus in accordance with the invention, certain parts of the apparatus being shown in elevation.
FIG. 3 is a view in transverse section through the apparatus of FIG. 2, the section being taken along the line 3—3 of FIG. 2.
FIG. 4 is a view in perspective of the prism 71 of the apparatus shown in FIG. 3.
FIG. 5 is a view in transverse section through a lower portion of the apparatus of the second embodiment, the section being taken along the line 5—5 of FIG. 2.
FIG. 6 is a view in transverse section through the still lower portion of the apparatus, the section being taken along the line 6—6 of FIG. 2.

It will be seen upon considering FIGS. 2 and 4 that the inner tube member 21' has a first small barrel 26' therein supporting a first source of collimated light in the form of a light bulb 29' and an objective lens 32'. The parallel light rays or beam issuing from lens 32' pass through polarizer plate 34' and are totally reflected by prism 36' so that they travel toward the specimen 14 as a beam 37' disposed at a predetermined angle of incidence with respect to the axis N—N'. Such angle of incidence, in the embodiment shown, is 45°. The objective prism device of FIG. 2, which is supported in bezel 12', in this instance is made up of a glass plate 81 having four small prisms 82, 84, 85, and 86 supported on the top thereof. Prisms 82 and 84 are disposed opposite each other, as shown, so that the beam 37' passes through prism 82 and then through plate 81 from which it passes downwardly into specimen 14. After reflection from the bottom surface 40 of the specimen, light beam 40' passes upwardly through plate 81 and prism 84, and then impinges upon prism 42'. The prism 42' totally reflects the beam so that it then travels in a path 44' upwardly along the inner surface of inner tube 21'.

Figure 7:
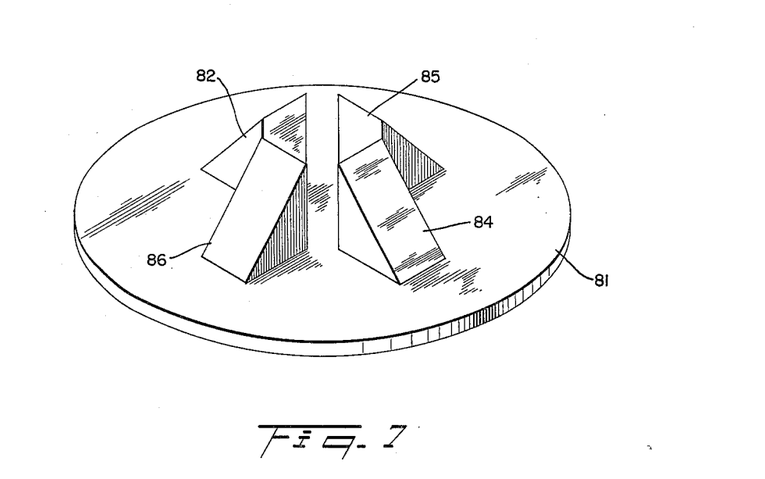
FIG. 7 is a view in perspective of the composite prism device employed in the apparatus of FIGS. 2 to 6, inclusive, such device resting upon the upper surface of the specimen.
Figure 8:
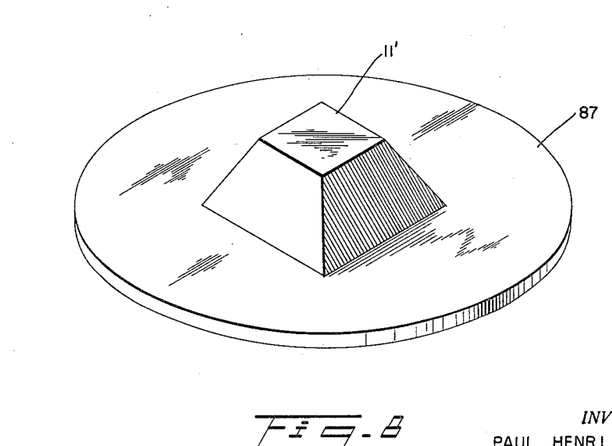
FIG. 8 is a view in perspective of an alternative prism device which may be employed in the apparatus in the place of that shown in FIG. 7.

As an alternative to the composite objective prism structure shown in FIG. 7 there may be employed an integral prism such as shown in FIG. 8 wherein a base plate 87 has a symmetrically disposed truncated regular pyramidal prism 11' disposed on the top thereof, the prism 11' being coaxial of plate 87.

Also carried on the inner tube 21' is a second source of collimated light which is disposed at an angle of 90° around axis N—N' of the apparatus with respect to the first such source. Such second source of light includes a small vertical tube or barrel 60 attached to the inner tube 21', barrel 60 carrying a socket 61 on its upper end, the socket supporting a second light bulb 62. Barrel 60 carries a collimative lens (not shown) at its lower end. The collimated beam of light from bulb 62 issuing from barrel 60 passes through a second polarizer plate 65, likewise of the plane polarizing type, which is supported on transparent diaphragm 35 at a position below barrel 60. The resulting polarized light beam passes successively through a prism 66, which is similar to prism 36', supported on the lower surface of diaphragm 35, prism 85, and plate 81, passing from the plate into the specimen in the same manner as light beam 37'. Such light beam from the second light source is reflected at the lower surface 40 of specimen 14, and passes upwardly therefrom in an emergent beam 70 which passes successively through plate 81, prism 86, and a prism 69 which is supported on the bottom surface of diaphragm 35' in a position diametrically opposite prism 66.

It will be seen from the above that the two emergent beams from the respective light sources travel up alongside the inner surface of tube 21' at locations displaced 90° with respect to each other about the axis of tube 10'. The apparatus includes means at its upper end for leading both the beams in side by side relationship through a compensator 16', and analyzer 13' and through an eyepiece lens system 19', 20' so that the two emergent beams may be viewed at the eyepiece, one on one side of the optical axis and the other on the other side of such axis. The apparatus also includes means whereby the specimen may be selectively viewed directly, as during the placing of the apparatus upon the specimen.

Adjacent the upper end of barrel 10' there is provided a horizontal reciprocable slide member 77 provided with thumb pieces 79 and 80 at its opposite ends whereby it may be reciprocated from the position shown in FIG. 2 to a position (not shown) corresponding to the position of member 46 in FIG. 1a. Element 77 carries on its upper surface a first elongated prism 45' which, when member 77 occupies the position shown in FIG. 2, diverts beam 44' from the described vertical path thereof which is widely displaced from the optical axis, below the prism 45', to a path 44" wherein it lies immediately adjacent but on one side of the axis N—N'.

Member 77 carries on its lower surface a short barrel 51' carrying objective lenses 52'. When element 77' is thrust into its left hand position, barrel 51' lies coaxial of axis N—N', so that the specimen may be viewed from directly above in the same manner as with the apparatus of FIGS. 1 and 1a.

In order to conduct the second emergent light beam 70 into the eyepiece of the apparatus so that such second beam lies on the other side of the axis from beam 44", there is provided a compound prism 71, shown more clearly in FIGS. 3 and 4, at a location in barrel 10' somewhat above the light sources, the compound prism 71 functioning with a second rectangular prism 76 on element 77 to accomplish this result.

As shown in FIGS. 2 and 3, a transparent diaphragm 73 is supported transversely of barrel 10' on an internal shoulder thereon. Prism 71, which is mounted on top of diaphragm 73, has two legs disposed at right angles to each other, the opposite end surfaces of such legs being oppositely slanted as shown at 72 and 75. The vertical light beam 70, rising along the inner wall of tube 10', is intercepted by end face 72 from which it travels inwardly of the prism, being totally reflected at the angular surface 74 thereof, the beam finally leaving the end face 75 of the prism as a vertical beam 70'. Beam 70' is intercepted by the radially outer end surface of prism 76 through which it travels horizontally, finally leaving prism 76 as a vertical beam 70" lying adjacent the axis N—N' and on the opposite side thereof from beam 44". As shown in FIG. 2, the beams 44" and 70" emerge from the upper eyepiece lens 20' on opposite sides of the optical axis. After properly placing the apparatus on the specimen an operator can therefore quickly determine the values of both $d_1$ and $d_2$. A first one of such values, $d_1$ for example, is determined by observing beam 44" as it emerges from the eyepiece after passing through analyzer 13' and compensator 16' and measuring either the displacement of the fringe on the scale, or the amplitude of the movement to be imposed to the compensator in order to compensate extra-birefringence. Thereafter the operator observes beam 70"; the operator is now able quickly to determine the value of $d_2$ in the same manner The apparatus of FIGS. 9 to 12, inclusive, allows the substantially direct measurement of one or the other of the principal stresses in the specimen, thereby simplifying the calculations which are necessary when the other two embodiments of the apparatus are employed. A brief discussion of the relationships between the principal stresses in the specimen and the observed birefringences will aid in understanding the structure and mode of operation of such third embodiment of the device.

As we have seen above $$p=a(d_1+hd_2) \text{ and } q=(d_2+hd_1),$$

$a$ being a constant depending upon the apparatus and $h=\cos^2 \theta$. When angle $\theta$ equal 45°, such equations may be put in the form:

$$p=\frac{a}{2}(2d_1+d_2) \text{ and } q=\frac{a}{2}(2d_2+d_1)$$

The apparatus of the third embodiment, to be described, is such that it directs a single light beam at an angle of incidence of 45° through a first path located in the plane of one principal stress in the specimen and then through two more paths in a plane at right angles to the first plane and containing the other principal stress. It will be understood that the directions of the planes of the principal stresses will have been initially determined, as by the use of suitable known apparatus, such as a polariscope. Accordingly, depending upon the manner in which the instrument is placed on the specimen, the measurement of the light beam finally emerging from the specimen gives directly the value of either $(2d_1+d_2)$ or $(2d_2+d_1)$, depending upon the manner of placement of the apparatus on the specimen. Let us assume that the value of $(2d_1+d_2)$ is first measured. Since the value of $$\frac{a}{2}$$

does not depend on the stress to be measured, the value of $p$ may be readily arrived at by mental calculation from the observed values or involving the constant in the designing of the reading scale, so that account of it is automatically taken. The instrument is then turned 90° about its axis and another measurement is taken. This gives the value of the $(2d_2+d_1)$, from which the value of $q$ is immediately obtained. It will be understood that the apparatus gives a direct comparison of $p$ and $q$, since $$\frac{a}{2}$$

is a constant.

Figure 9:
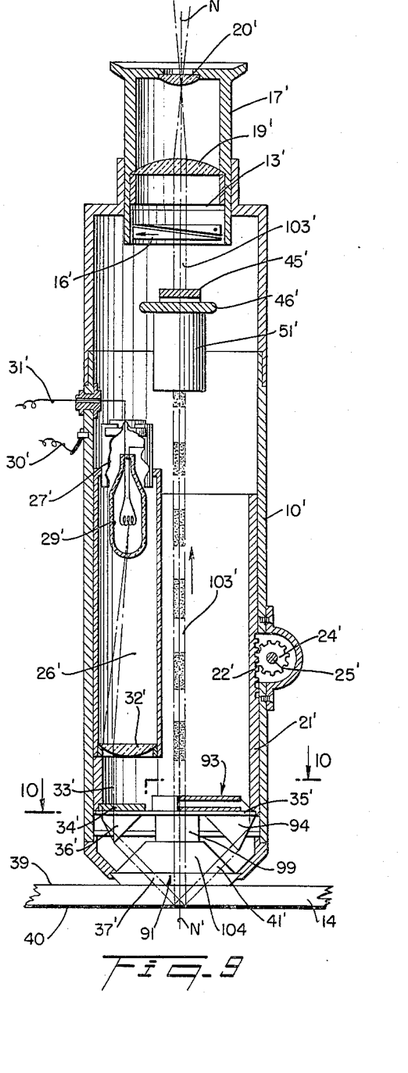
FIG. 9 is a view in vertical axial section through a third embodiment of polarimetric apparatus in accordance with the invention, certain parts of the apparatus being shown in elevation.

In its overall configuration and basic frame structure the apparatus of FIGS. 9 to 12, inclusive, is generally the same as that of the second embodiment. Consequently, parts of the apparatus of FIGS. 9 to 12, inclusive, which are the same as those from 2 to 6, inclusive, are designated by the same reference characters. As shown in FIG. 9, a beam of collimated light 33' passes through a polarizing plate 34' and into a prism 36' from which it is totally reflected as a beam 37' which enters specimen 14 at an incident angle of 45° with respect to axis N—N'. The beam 41', reflected from the rear surface 40' of the specimen 14, emerges from the specimen and falls upon the radially outer portion of a prism 94 supported on the lower surface of transparent diaphragm 35. Prisms 36' and 94 are disposed oppositely, as shown. Incident beam 37' and reflected beam 41', as in previous embodiments, pass through a prism 91 in contact with the upper surface of the specimen. Except for the presence of a reflecting coating 101, to be described, on one of the four side surfaces of prism 91 facing the reader in FIG. 9, and the fact that said one side surface of the prism lies at an angle with respect to axis N—N' which is slightly different from 45°, for a reason to be described, prism 91 is identical with the truncated pyramidal prism 11' shown in FIG. 8. Let us assume that the apparatus has been placed upon the specimen so that the plane containing beams 37' and 41' coincides with the plane of the principal stress $p$. Such initial passage of the light into and out of the specimen therefore will optically have supplied the value of $d_2$ in the formula $$p=\frac{a}{2}(2d_1+d_2)$$

The light beam must now be directed twice into and out of the specimen in a plane at right angles to the direction of stress $p$, thereby to add to the light beam the value $2d_1$. This is accomplished in the following manner.

Figure 10:
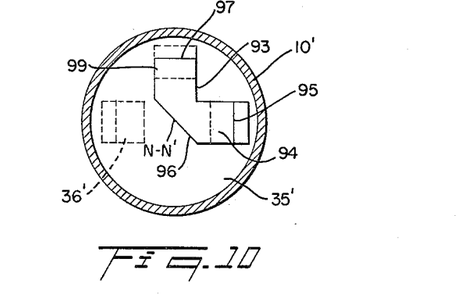
FIG. 10 is a fragmentary view in transverse section through the lower part of the apparatus, the section being taken along the line 10—10 of FIG. 9.
Figure 11:
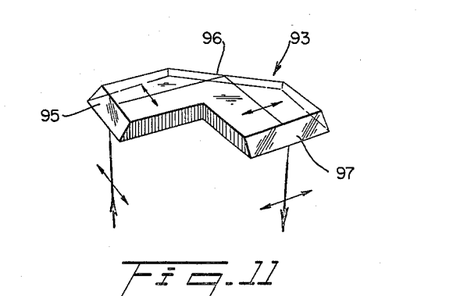
FIG. 11 is a view in perspective of the prism 93 shown in FIG. 10.

After its reception at the radially outer end of prism 94, the emergent light beam is reflected vertically upwardly a short distance through diaphragm 35 and into the radially outer end 95 of a first leg 94 of a right angled prism 93 shown more clearly in FIGS. 10 and 11. As shown in FIG. 11, the upwardly travelling light beam enters prism 93, is reflected to travel horizontally until it meets oblique surface 96 of the prism, is then reflected again horizontally at an angle displaced 90° with respect to its first horizontal path until it is reflected at end 97 of leg 99 of prism 93. Prisms 94 and 93 have, therefore, effected the turning of the light beam through an angle of 90° about the axis N—N', the end 97 of prism 93 finally presenting the beam in a vertical direction as the beam travels downwardly into diaphragm 35'.

Supported on the bottom surface of diaphragm 35' is a prism 99 which is similar to the above described prism 36'. Such prism 99 is disposed on a diameter at right angles of the plane containing prisms 36' and 94 with the radially outer end of prism 99 projecting outwardly of end 97 of prism 93 as shown in FIG. 10.

Figure 12:
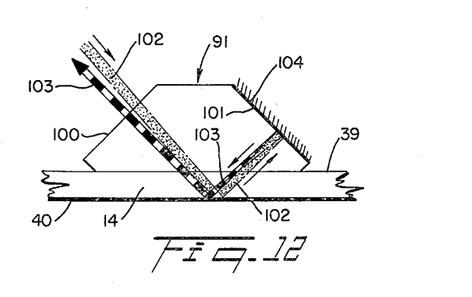
FIG. 12 is a fragmentary somewhat schematic view showing the paths of travel of certain of the incident and emergent light rays traversing the specimen and the lowermost prism 91 of the apparatus of FIGS. 9, 10, and 11.

It will be apparent that the light beam leaving end 97 of prism 93 will enter prism 99 and be reflected therein as a beam 102 (FIG. 12) which travels downwardly at an angle of 45°, in a manner similar to beam 37', and that such beam passes successively through the rear face 100 of prism 91, through prism 91, and into specimen 14, being totally reflected at the bottom surface 40 of the specimen. The light beam 102 then emerges from the specimen and passes into prism 91 until it reaches the forward surface 101 of the prism. Surface 101 lies at an angle slightly different from 45° with respect to the axis N—N'. In the embodiment shown, the angle which surface 101 makes with respect to the axis is slightly less than 45°. Surface 101 is provided with a reflecting metallic surface 104, similar to the coating on a mirror, so as to provide total metallic reflection. As a result, as shown in FIG. 12, the beam 103 reflected from surface 101 follows a path slightly displaced from that of beam 102, and the finally emergent beam 103, shown in FIG. 12 as a heavy dotted line, lies at an angle slightly different from incident beam 102. For clarity of illustration the angular differences between corresponding portions of the paths of beams 102 and 103 are shown greatly exaggerated in FIG. 12. The slight deviations in angle from 45° with respect to the normal of beams 102 and 103 is not sufficient to introduce any errors greater than those permissible into the measured results.

There now remains the task of diverting the emergent beam 103 to a path of travel along the inner wall of barrel 21' as such beam travels upwardly in the housing of the apparatus, and of receiving the resulting diverted beam 103' into the eyepiece system. It is also desirable that the apparatus should be such as to permit the selective viewing of the specimen from above. Both these results are accomplished by means which are similar to those which have been described above in connection with the first two embodiments of the apparatus. Thus, beam 103 emerging from face 100 of prism 91 falls upon the portion of prism 99 which projects outwardly beyond end 97 of prism 93, and is diverted by such outer portion of prism 99 into a vertical path lying alongside the inner surface of barrel 21'. Beam 103' is diverted radially inwardly to lie on the axis N—N', when slide member 46' is appropriately positioned, by a prism 45'. The thus diverted beam 103' passes successively through compensator 16', analyzer 13', and the lenses of the eyepiece. The specimen may be viewed directly from above by reciprocating slide 46' to occupy the same position as that in FIG. 1a, whereby the lens system in barrel 51' on slide 46' is coaxial with axis N—N' of the apparatus.

Although only a limited number of embodiments of the invention have been illustrated in the accompanying drawings and described in the foregoing specification, it is to be expressly understood that various changes, such as in the relative dimensions in the parts, materials used, and the like as well as the suggested manner of use of the apparatus of the invention, may be made therein without departing from the spirit and scope of the invention as will now be apparent to those skilled in the art. Thus, for example, the polarizing plates employed in the various embodiments of the apparatus may be of the type which circularly polarize the light rather than plane polarize it.

What is claimed is:

1. Apparatus for measuring birefringences and internal stresses in a material capable of transmitting and internally reflecting light rays, said material being in the form of a plate with parallel surfaces, said apparatus being adapted for measuring the values of the principal rectangular stresses in said material by two observations effected in the principal planes, said apparatus comprising means to project in a direction perpendicular to the upper surface of the plate a beam of polarized light having its plane of polarization inclined with respect to the plane of incidence on the plate to be examined, a transparent refringent body adapted to make optical contact with the first face of the plate, optical means for diverting the polarized beam toward the transparent refringent body, the polarized light beam passing from the transparent refringent body through the first surface of the plate without deviation and partial reflection and penetrating obliquely into the plate at such predetermined angle with respect to the normal to the plate that said beam is totally reflected on the under surface of the said plate, the transparent refringent body being so constructed and arranged that the reflected emergent beam passes into such body and thence out of it along a path oblique with respect to said surfaces of the plate, optical means to receive the beam emerging from the transparent refringent body along said oblique path and to divert it into a further path normal to the said surfaces of the plate, and means in said last mentioned further path to measure the birefringences, in particular those due to the stresses in the plate of material.

2. Apparatus as defined in claim 1 wherein the means to project the beam of light includes a source of light and means for collimating and polarizing the light issuing therefrom, the mean ray of the beam issuing from the source of light and the axis of the collimated beam being substantially normal to the surfaces of the plate.

3. Apparatus as defined in claim 2 comprising an elongated generally cylindrical housing disposed normal to the surfaces of the plate of material, the source of the beam of the collimated polarized light, the means for diverting such beam, and the means for receiving the emergent beam and for diverting it so that the outer end of the path of the emergent beam lies normal to the surfaces of the plate all being mounted within said housing.

4. Apparatus as defined in claim 3 wherein the said light source lies within a smaller sub-housing connected to the housing adjacent one side of the latter.

5. Apparatus as defined in claim 4 wherein the sub-housing containing the light source is disposed on one side of the axis of the housing, and wherein the housing is terminated by an optical end piece positioned in contact with the plate of material, and the means for receiving and conducting the emergent beam includes means located adjacent the optical end piece of the housing for receiving and conducting the emergent rays in a path disposed normal to the surfaces of the plate of material and on the other side of the axis of the housing.

6. Apparatus for measuring birefringences and internal stresses in a material capable of transmitting and internally reflecting light rays, said material being in the form of a plate with parallel surfaces, said apparatus being adapted for measuring the values of the principal rectangular stresses in said material by two observations effected in the principal planes, comprising an elongated generally cylindrical housing disposed normal to the surfaces of the plate of material, means within the housing to project in a direction substantially perpendicular to the upper surface of the plate a beam of polarized light, said last named means including a smaller sub-housing connected to the housing adjacent one side of and on one side of the axis of the housing, a source of light in the sub-housing, and means for collimating and polarizing the light issuing therefrom, the mean ray of the beam issuing from the source of light and the axis of the collimated beam being substantially normal to the surfaces of the plate, an optical end piece positioned within the end of the housing and disposed in the path of said beam in advance of the impingement of the beam upon the upper surface of the plate for diverting such beam and for causing it to penetrate obliquely into the plate at such a predetermined angle with respect to the normal to the surface of the plate that said beam is totally reflected on the under surface of the said plate, said optical end piece being positioned in contact with the plate of material, means within the housing to receive and divert the beam emerging from the plate into a path which is normal to the surfaces of the plate, said last named means including means located adjacent the optical end piece of the housing for receiving and conducting the emergent rays in a path disposed normal to the surfaces of the plate of material and on the side of the axis of the housing opposite from the sub-housing, means in the path of the emergent beam to measure the birefringences, in particular those due to the stresses in the plate of material, said measuring means including a compensator, an analyzer, and an eyepiece mounted adjacent the upper end of the housing, and means adjacent the upper end of the housing but below the compensator for diverting the emergent beam laterally radially inwardly to pass through the means to measure the birefringences due to the stresses.

7. Apparatus as defined in claim 6 comprising means selectively movable transversely of the housing into one of two positions, said movable means mounting said last-named upper beam receiving and diverting means, said mounting means having a passage therethrough which may be selectively interposed in alignment with the eyepiece, whereby when the supporting means is in one position the plate of material may be examined and the stresses therein measured by polarized light, and that when the support is in the other position the speciment may be directly viewed from above.

8. Apparatus as defined in claim 7 wherein the light source is so arranged relative to the polarizing means that the surfaces of the specimen are illuminated in part by unpolarized light from the light source.

9. Apparatus for measuring birefringences and internal stresses in a material capable of transmitting and internally reflecting light rays, said material being in the form of a plate with parallel surfaces, said apparatus being adapted for measuring the values of the principal rectangular stresses in said material by two observations effected in the principal planes, said apparatus comprising means to project in a direction substantially perpendicular to the upper surface of the plate a beam of polarized light, and optical means disposed in the path of said beam in advance of the impingement of the beam upon the upper surface of the plate for diverting such beam and for causing it to penetrate obliquely into the plate at such a predetermined angle with respect to the normal to the surface of the plate that such beam is totally reflected on the under surface of said plate, said last-named means comprising a first, objective prism having an index of refraction such as to minimize refraction between the prism and plate of material, the prism being adapted to make optical contact with the upper surface of the plate of material, a second prism acting with the first, objective prism to conduct and guide the incident collimated polarized beam of light into the plate of material, means to receive and divert the beam emerging from the plate into a path lying generally normal to the surfaces of the plate, said last named means comprising a third prism which acts with the first, objective prism to conduct and guide the beam of such light emerging from the plate of material, and means in the path of the emergent beam of light to compensate extra birefringences and to measure the birefringences, in particular those due to the stresses in the plate of material.

10. Apparatus for measuring birefringences and internal stresess in a material capable of transmitting and internally reflecting light rays, said material being in the form of a plate with parallel surfaces, said apparatus being adapted for simultaneously measuring the values of the two principal rectangular stresses in said material, said apparatus comprising means to project onto the upper surface of said plate of material a first beam of polarized light and to cause it to travel obliquely into the plate in the plane of one principal stress along a direction at such a first angle with respect to the normal to the surface of the plate that said beam is totally reflected on the under surface of the said plate, means to project a second beam of polarized light on the said plate of material and to cause it to travel in the plane of the other principal stress along a direction at a second angle equal to the first such angle, means to receive and divert the beams emerging from the plate into paths at least the outer portion of each of which lies generally normal to the surfaces of the plate, the outer extreme portions of the paths of such two beams lying close to each other, and means in said paths to measure the birefringences, in particular those due to the stresses in the plate of material.

11. Apparatus as defined in claim 10 wherein each means to project the beam of light includes a source of light and means for collimating and polarizing the light issuing therefrom, the elements of each of the sources of light lie in a line substantially normal to the surfaces of the plate, and means for diverting the collimated polarized beam of light so that it lies at said incidence angle with respect to the normal to the plate.

12. Apparatus as defined in claim 11 wherein each source of light comprises an elongated generally cylindrical housing disposed normal to the surfaces of the plate of material, the source of the beam of the collimated polarized light, the means for diverting such beam, and the means for receiving and conducting the emergent beam normal to the surfaces of the plate all being mounted within said housing.

13. Apparatus as defined in claim 12 wherein each of the said light sources lies within its respective smaller sub-housing connected to the housing adjacent one side of the latter, the two sub-housings being displaced at an angle of 90° from each other about the axis of the housing.

14. Apparatus as defined in claim 12, wherein each of the sub-housings containing a light source is disposed on one side of the axis of the housing, and wherein the means for receiving and conducting the respective emergent light beams includes means located adjacent the end of the housing adapted to be disposed adjacent the plate of material for receiving and conducting the respective emergent rays in paths disposed on the other side of the axis of the housing from the sources of such rays.

15. Apparatus as defined in claim 14 comprising means for diverting the two emergent beams of light so that in the outer extreme portions of the paths thereof they lie close to each other but on opposite sides of the axis of the housing.

16. Apparatus for measuring birefringences and internal stresses in a material capable of transmitting and internally reflecting light rays, said material being in the form of a plate with parallel surfaces, said apparatus being adapted for substantially directly measuring the values of the principal rectangular stresses in said material, said apparatus comprising means to project a beam of polarized light onto the upper surface of said plate of material and to cause it to travel obliquely into the plate along the plane of one of said principal stresses along a direction at such an angle with respect to the normal to the surface of the plate that said beam is totally reflected on the under surface of said plate, means to receive the beam emerging from the plate and to reintroduce it into the plate of material at the same angle but along the plane of the other principal stress, means to receive the beam of light emerging from the plate and to measure the birefringence in the received beam of light, in particular those due to the stresses in the plate of the material.

17. Apparatus as defined in claim 16 comprising means for introducing the beam of light twice into the plate of material along the plane of one of said principal stresses.

18. Apparatus as defined in claim 17 comprising a mirror disposed above the upper surface of the plate of material and at such angle with respect thereto that the beam of light when first emergent from the plate of material along the plane of the other of said principal stresses is reflected back into the plate of material at substantiallly the same angle of incidence as that of the first travel of the beam of light in the plate of material in the plane of the second principal stress.

19. Apparatus as defined in claim 18 comprising a prism having oppositely disposed inclined upper side surfaces at the objective end of the housing, said prism having an index of refraction such as to minimize refraction between the prism and the plate of material, the prism being adapted to make optical contact with the upper surface of the plate of material, and wherein said mirror is located on one of the upper side surfaces of said prism.

20. A method for the determination of the principal rectangular stresses in a transparent vitreous article having parallel faces which comprises successively passing a beam of polarized light into and out of the article, the beam traversing a path composed of three successive parts each composed of a passage into the article and a total reflection from the second surface of the article, each passage of the beam into the article being along a line slanting substantially 45° with respect to an axis normal to the article, receiving the light beam after its third reflection from the second surface of the article, measuring the birefringence of the light beam as thus last received, and deriving the value of the principal stress in the article in the said second plane from the measured birefringence.

21. A method for the determination of the principal rectangular stresses in a transparent vitreous plate having parallel faces which comprises subjecting a first surface of the plate to a beam of polarized light and causing such beam to travel within the plate along a line slanting at 45° with respect to an axis normal to the plate and in a first plane normal to the plate and coinciding with one of the principal stresses in the plate, then receiving the said light beam as thus reflected from the second surface of the plate and redirecting it, in a second plane which is disposed normal to the plate and at 90° with respect to the first plane, upon the first surface of the plate so that it travels within the plate at an angle slanting at 45° with respect to said axis, then receiving the said light beam as reflected from the second surface of the plate and redirecting it in said second plane, so that it travels within the plate at an angle slanting at substantially 45° with respect to said axis, upon the first surface of the plate, receiving the light beam after its third reflection from the second surface of the plate, measuring the birefringence of the light beam as thus last received, and deriving the value of the principal stress in the plate in the said plane from the measured birefringence.

22. Apparatus using polarized light for measuring internal stresses and birefringences in a plate of transparent material, which is adapted for measuring the separate values of the principal stresses by two observations effected in the principal planes, said apparatus comprising an emitter device receiving light from a light source and including a collimator and a polarizer capable of giving a polarized parallel beam of light having its plane of polarization inclined with respect to the plane of incidence of the light on the plate to be examined, a receiver device including an analyzer and a means for measuring birefringences, the axes of the emitter and of the receiver being parallel and perpendicular to the plate, means rigidly connecting the receiver device, the emitter device and optical means for diverting the polarized beam of light from the emitter toward a transparent refringent body adapted to make optical contact with the first face of the plate and to enable the light beam from the emitter to pass through the first face of the plate without deviation and partial reflection and to penetrate obliquely into the plate at a predetermined angle with respect to the normal to the plate, and in particular to cause the angle in the interior of the plate between the incident beam and the normal to the second face of the plate to be greater than the critical angle of the plate with respect to air, and to allow the beam of light reflected by the second face of the plate to be directed to diverting means capable of causing the reflected beam to pass into the receiver parallel to its axis.

23. Apparatus according to claim 22 comprising two emitter devices each receiving light from a light source and including a collimator and a polarizer capable of giving a polarized parallel beam of light having its plane of polarization inclined with respect to the plane of incidence of the light on the plate to be examined, said two emitter devices producing two polarized light beams having their mean rays situated in rectangular planes perpendicular to the face of the refringent body adapted to be in contact with the plate to be examined.

24. Apparatus according to claim 23 comprising optical means capable of bringing the mean rays of one of the beams emerging from the plate in the axial plane containing the mean ray of the other emergent beam.

25. Apparatus according to claim 22 in which the polarized light beam passes into the plate along a single path comprising a reflection on the under face of the plate.

26. Apparatus according to claim 23 in which each polarized light beam passes into the plate along a single path comprising a reflection on the under face of the plate.

27. Apparatus according to claim 22, means to cause said beam of polarized light to travel, in one of the principal planes of the plate, in a double path through the plate, and optical means to cause the beam to pass from one principal plane of the plate to the other.

28. Apparatus according to claim 22 provided with an eyepiece having its axis aligned with the axis of symmetry of the apparatus.

29. Apparatus according to claim 22 comprising two telescopically mounted tubes, the external tube supporting the upper part of the receiver and at its lower part the refringent body, the internal tube supporting the collimator, the polarizer and the optical diverting means, these tubes being connected by means permitting their relative displacement.

30. Apparatus for measuring birefringences and internal stresses in an article capable of transmitting and internally reflecting light rays, said article having substantial parallel first and second faces at at least one zone thereof, said apparatus being adapted for measuring the values of the principal rectangular stresses in said article at the said zone by two observations effected in the principal planes, said apparatus comprising two concentric tubes, one mounted within and slidable with respect to the other, the outer tube carrying at its lower end a first prism adapted to be placed in optical contact with the plate to be examined, means mounted on the inner tube to project a beam of polarized light perpendicularly to the face of the said zone, said last named means comprising a collimator, a polarizer, and a second prism which diverts the beam of polarized light, after it has passed the collimator and polarizer in that order, so that it passes into the first prism at an oblique angle, the first prism causing penetration of the beam of polarized light into the article at such an incident angle with respect to the normal to the face of the article that said beam is totally reflected on the under face of said article, means to receive and divert the beam emerging from the article into a path which, outside the article, is normal to the faces of the article, means in said path to measure the birefringences, in particular those due to the stresses in the article at said zone, and means for reciprocating the inner tube relative to the outer tube, whereby the apparatus may be adjusted to examine articles of different thicknesses.

31. Apparatus for measuring birefringences and internal stresses in an article capable of transmitting and internally reflecting light rays, said article having substantially parallel first and second faces at at least one zone thereof, said apparatus being adapted for measuring the values of the principal rectangular stresses in said article at said zone by two observations effected in the principal planes, said apparatus comprising means to project a beam of polarized light perpendicularly to the surface of the said article at the said zone, a transparent refringent body adapted to make optical contact with the first face of the article at said zone, means for diverting the polarized beam toward the transparent refringent body, the polarized light beam passing from the transparent refringent body through the first face of the plate without deviation and partial reflection and penetrating obliquely into the article at such an incident angle with respect to the normal to the faces of the article that said beam is totally reflected on the under face of said article, means to receive the beam emerging from the article and to divert such beam into a further path which outside the article is normal to the faces of the article, and means in said further path to measure the birefringences, in particular those due to the stresses in the article at said zone.

References Cited in the file of this patent

UNITED STATES PATENTS

| | | |
|---|---|---|
| 1,978,434 | Maris | Oct. 30, 1934 |
| 2,014,688 | Mabboux | Sept. 17, 1935 |
| 2,119,577 | Gray | June 7, 1938 |
| 2,409,853 | Heijn | Oct. 22, 1946 |
| 2,457,799 | Altenberg | Jan. 4, 1949 |
| 2,460,515 | Lowber et al. | Feb. 1, 1949 |

FOREIGN PATENTS

| | | |
|---|---|---|
| 378,833 | Germany | Aug. 3, 1923 |
| 530,724 | Great Britain | Dec. 18, 1940 |

OTHER REFERENCES

Hetenyi (editor): Handbook of Experimental Stress Analysis, John Wiley and Sons, New York, 1950, pages 845, 864, 865.

Lee: An Introduction to Experimental Stress Analysis, John Wiley and Sons, New York, 1950, pages 176–179.